United States Patent [19]
Gibbs

[11] Patent Number: 5,654,508
[45] Date of Patent: Aug. 5, 1997

[54] METHOD OF DETERMINING A STORE'S PHYSICAL INVENTORY

[76] Inventor: John Harvey Gibbs, 333 S. Clay St., Mooresville, Ind. 46158-1705

[21] Appl. No.: 393,184

[22] Filed: Feb. 23, 1995

[51] Int. Cl.$^6$ .............................. G01L 1/16; C01N 29/20
[52] U.S. Cl. .................. 73/599; 73/579; 73/630; 73/629; 364/567; 364/478.01; 395/222
[58] Field of Search .................. 73/579, 580, 597, 73/598, 599, 600, 602, 630, 629; 364/478, 403, 567

[56] References Cited

U.S. PATENT DOCUMENTS

| | | | |
|---|---|---|---|
| 3,605,089 | 9/1971 | Gray | 364/403 |
| 3,800,893 | 4/1974 | Ramsay et al | 364/567 |
| 3,960,007 | 6/1976 | Swensen | 73/579 |
| 4,050,530 | 9/1977 | Storace | 73/580 |
| 4,108,363 | 8/1978 | Susumu | 235/383 |
| 4,157,738 | 6/1979 | Nishiguchi et al. | 364/567 |
| 4,419,734 | 12/1983 | Wolfson et al. | 364/567 |
| 4,612,807 | 9/1986 | Wunderer | 73/580 |
| 5,235,559 | 8/1993 | Ogushwitz et al. | 367/99 |

*Primary Examiner*—Robert Raevis
*Assistant Examiner*—Rose M. Finley

*Attorney, Agent, or Firm*—Woodard, Emhardt, Naughton, Moriarty & McNett

[57] ABSTRACT

New physical principles are used to determine the number of inventory goods on a store's display shelves. One principle involves transmitting waves (mechanical, sound or ultrasound) thru an unknown number of goods resting on an insulated plate. Another principle to determine the unknown mass is the inertial response caused by mechanical vibration. By measuring the reflected waves or response time, a computer or processor can determine the steady state condition. For the absorption method, the device receives waves and determines when the phase angle difference (between the transmitter's wave profile and the receivers' average wave profile) is zero. This zero phase angle means a standing wave exists in the insulated plate and its goods. By subtracting the intensities of the waves (transmitter minus receivers' average) the total absorption energy can be determined. Since the aborption energy of one item of goods added to itself equals the aborption energy of two items (or the aborption energy is additive), a calculation can determine the total number of unknown goods on the insulated plate. For the inertial method, the device recieves response times due to vibrations and determines the steady state response. At this point, the energy of the system is determined, therefore the mass is calculated.

6 Claims, 8 Drawing Sheets

METHOD OF DETERMINING A STORE'S PHYSICAL INVENTORY

BACKGROUND

1. Field of Invention

This invention relates to methods of taking physical inventory of goods in a store.

2. Prior Art

U.S. Pat. No. 4,419,734 discloses the standard approach to an inventory system by putting weight sensors in the stock selves. U.S. Pat. No. 5,235,559 discloses a method of using sound's standing waves to determine the thickness of a mass. However, this method doesn't use an absorption energy method. U.S. Pat. No. 4,812,887 shows how sound can be reflected & refracted thru a mass for determining the mass' thickness. Standing waves are not used in this method.

OBJECTS & ADVANTAGES

Accordingly, the object & advantage of my invention is the determination of an unknown number of identical items thru dividing the standing wave's absorption energy or steady state inertia for an unknown mass by the wave energy or inertia of a known mass.

DESCRIPTION OF DIAGRAMS

FIG. 2B-1 shows the inertial base plate's top view with springs that recoil the top layer.

FIG. 2B-2 shows an inertial base plate that has the two layers divided by a layer of ball bearings.

REFERENCE NUMBERS FOR DIAGRAMS

| | |
|---|---|
| 1A | Stock Shelf |
| 1AA | Store Goods |
| 1BA | Energy Source (battery) |
| 1BAA | Battery Pack |
| 1BB | Push Cart |
| 1BC | Laptop Computer |
| 2 | Base Plate |
| 2A | Bottom Insulation Layer (low density) |
| 2B | Top Conducting Layer (high density) |
| 2C | Ball Bearings |
| 2D | Springs |
| 2E | Flap Overhang |
| 3 | Wave Reader |
| 3A | Cord |
| 3AA | Data lines |
| 3AB | Power Lines |
| 3AC | Plug-in |
| 3B | Handle |
| 3C | Trigger |
| 3D | Transmitter |
| 3E | Reciever |
| 3EA | Adjustment Knob |

REFERENCE NUMBERS FOR DIAGRAMS

| | |
|---|---|
| 3EAA | Screw Rod |
| 3EAB | Connecting Band |
| 3F | Control Circuit for Wave Reader |
| 3G | Data Display (LCD) |

SUMMARY OF INVENTION

The invention is a method that is used by a store to take physical inventory on its goods. The invention is a device, Nave Reader, that emits waves (either sound or mechanical) thru an insulated plate with stored goods on it. The total steady state energy of the system (either by absorption or vibration energy) is determined (and the unknown mass(es) is calculated). In the operation, a worker presses the wave transmitter-receiver (wave reader) against the plate and triggers the start. When done, the computer accesses the total energy from the wave reader and previous store data from the data base to determine the goods' unknown number. The computer can beep the worker of an error or completion of the inventory so the next UPC item on the shelf can be done.

DESCRIPTION

Figure 1:
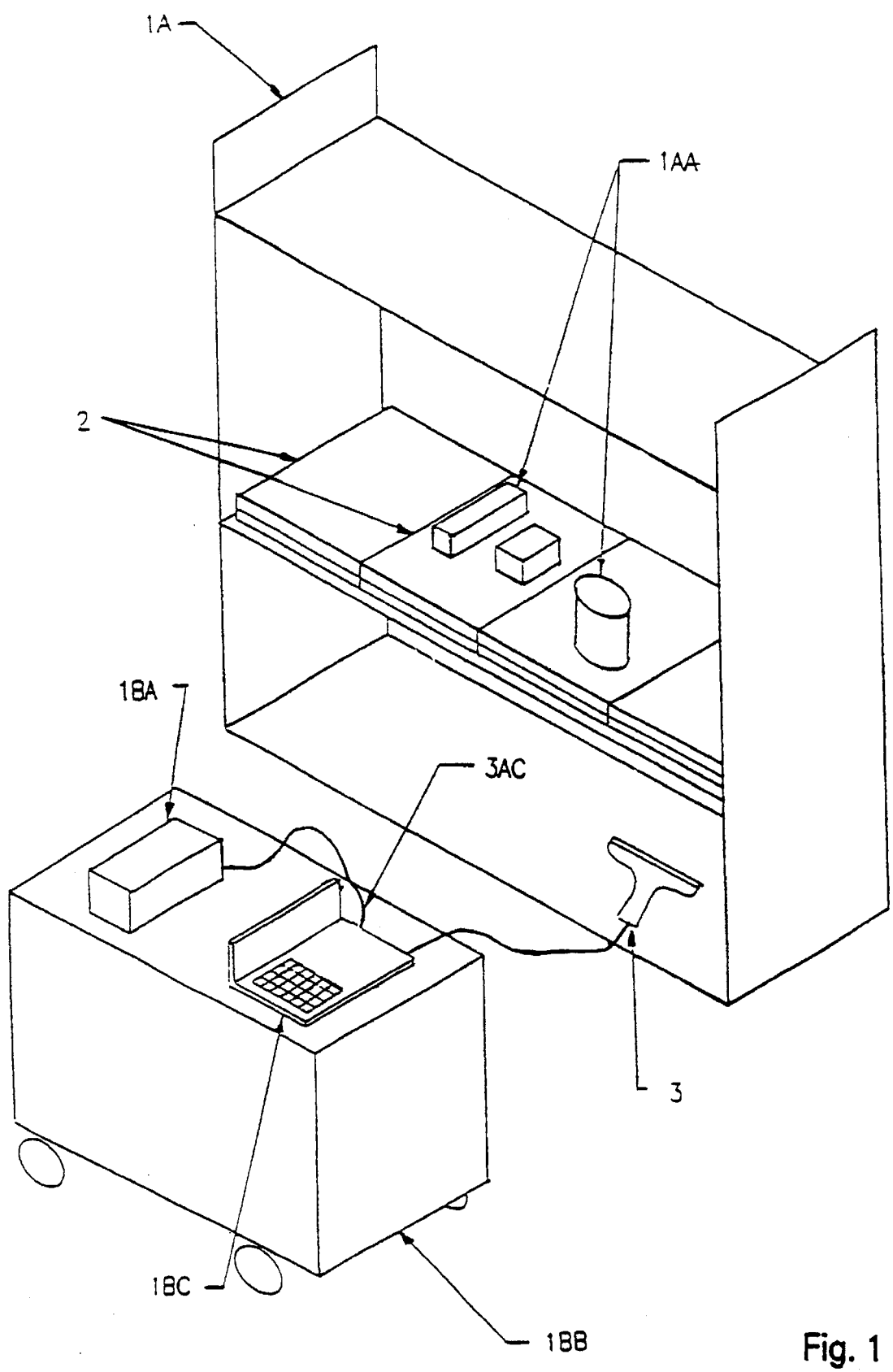
FIG. 1 shows the invention in application to a grocery store. The device is connected to a laptop computer and being applied to a base plate with store goods on top of it.

FIG. 1 shows a typical grocery store shelf 1A with the inventory system. The stock shelf 1A has a display of the goods 1AA (shown with only one shelf). Each similar type of goods 1AA has underneath it its own individual base plate 2. The invention consists of base plates 2 and a wave reader 3; however, the store owner will have to supply a laptop computer 1BC with software and an energy source 1BA to utilize the function of the invention. Shown in FIG. 1 is a push cart 1BB with laptop computer 1BC and battery 1BA on it. The energy source 1BA provides the electrical power to the wave reader 3. The wave reader 3 has a data link to the laptop 1BC via a plug-in SAC. Ideally, the push cart 1BB moves down the store's aisles and the operator presses the wave reader 3 against a base plate 2. By pulling the wave reader's trigger (see FIG. 3A), it activates the wave reader 3. The wave reader 3 transmits a pressure wave, either sound or mechanical (mechanical vibration is a longitudinal wave and therefore a pressure wave); thru the base plate 2 and the goods 1AA resting on the base plate 2. In the following, assume the pressure wave is not mechanical vibration. The wave reader 3 has two receivers 3E (see FIG. 3A) that can determine if the transmitted wave has reached a standing wave (steady state wave in the material). The energy required to generate this standing wave is called the saturation energy. The operator will have a data base in the laptop's 1BC software that has stored previous information concerning the universal price code (UPC) and saturation energy for the base plate 2 and one item on the base plate 2. In this way, the computer 1BC can divide the saturation energy minus the base plate's 2 saturation energy by one item's saturation energy minus the base plate's 2 saturation energy and get the number of goods 1AA on the base plate 2. If the number of goods is not an integer, the computer 1BC will tell the operator an error exists (something else is on the base plate 2). The store installs the system by cutting the base plates 2 to the size of the display shelf's 1A area for that UPC goods 1AA. Then they record in the data base with the wave reader 3, the saturation energies for the base plate's 2 and one item of goods on the base plate 2. The data base may also be required to an optimal frequency of the goods' 1AA absorption coefficient with mechanical vibration, the wave reader 3 vibrates the base plate 2 (inertial design) that perturbares the resting goods. The wave reader 3 records the response times to the forcing emitter (on the wave reader). Since the base plate 2 has springs, the pattern of mass movement is cyclical and can determine the momentum mass with a computer (and previous experimental data).

Figure 2A:
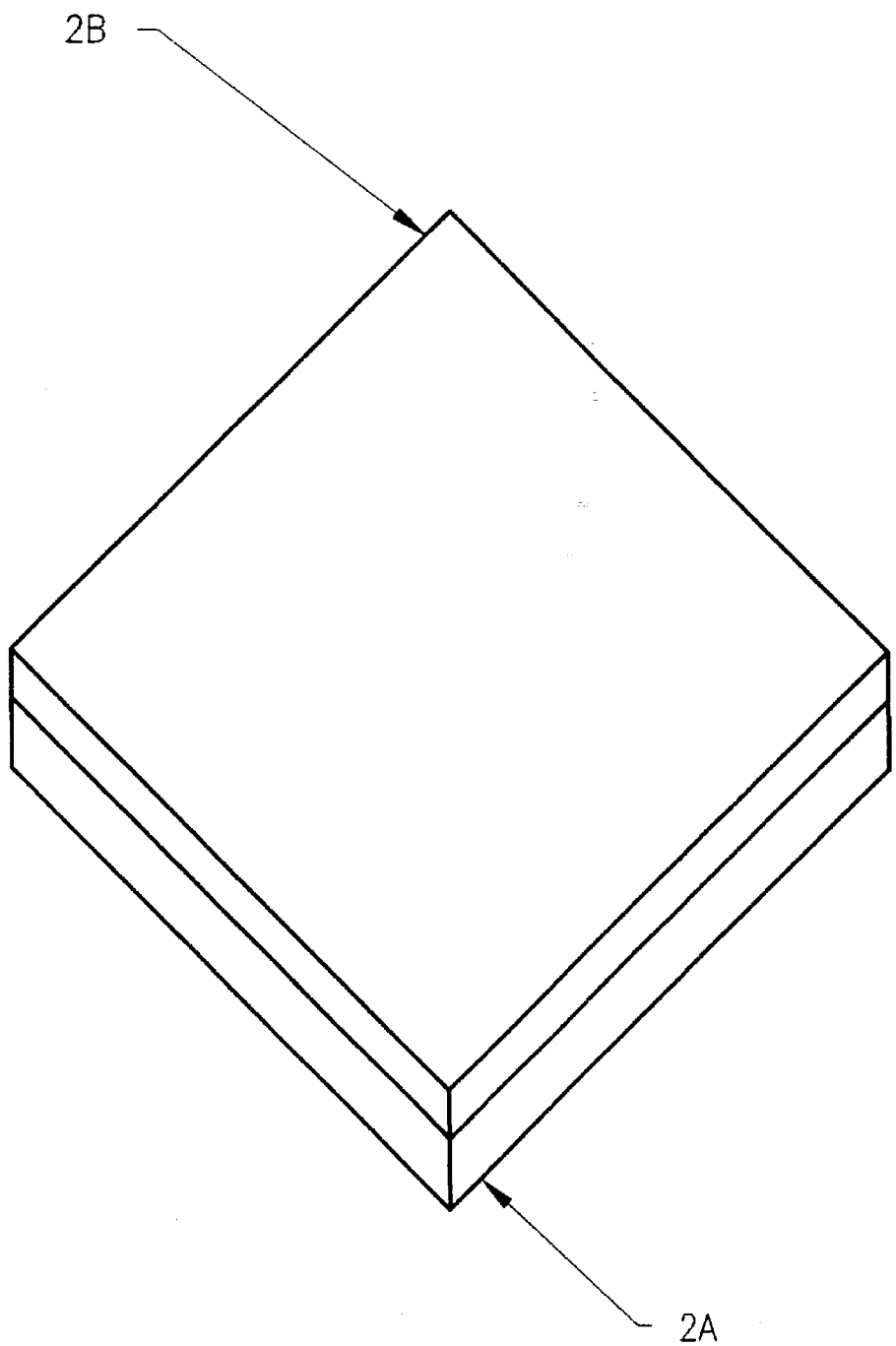
FIG. 2A shows a base plate that is underneath every unique UPC goods.

FIG. 2A shows a diagram of a base plate 2. The base plate 2 must have a high density material top layer 2B and a low density material bottom layer 2A. The top layer 2B has to transfer wave energy to the goods 1AA resting on it. This layer 2B can be made of wood, but using hard plastic would ensure uniform distribution of the wave energy throughout the plate 2. The bottom layer 2B is an insulation between the top layer and the surrounding materials. By isolating the top layer 2B, wave energy will be confined to saturating the goods 1AA and not leak to other material. The bottom layer 2A can be made of foam rubber that will resist waves from propagating elsewhere. It is critical to have the top layer 2B isolated from other high density masses touching it or the method will not work effectively. This could mean placing foam rubber inbetween two adjacent base plates 2.

Figures 1, 2B:
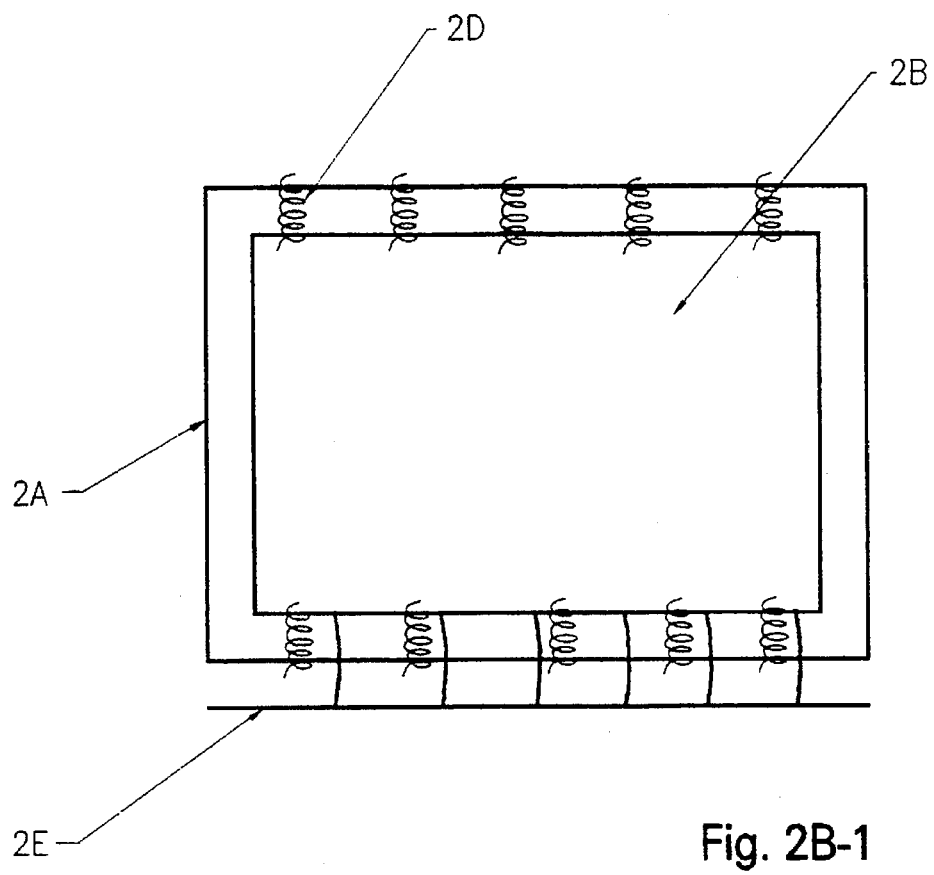

FIG. 2B-1 shows the inertial base plate. The top layer 2B & bottom layer 2A are still used. However the front & back part of the top layer 2B are connected with springs 2D to the bottom layer 2A. Also the front part of the top layer has an flap 2E that overhangs the bottom layer 2A (for the wave reader 3 to move the top layer 2B).

Figures 2, 2B:
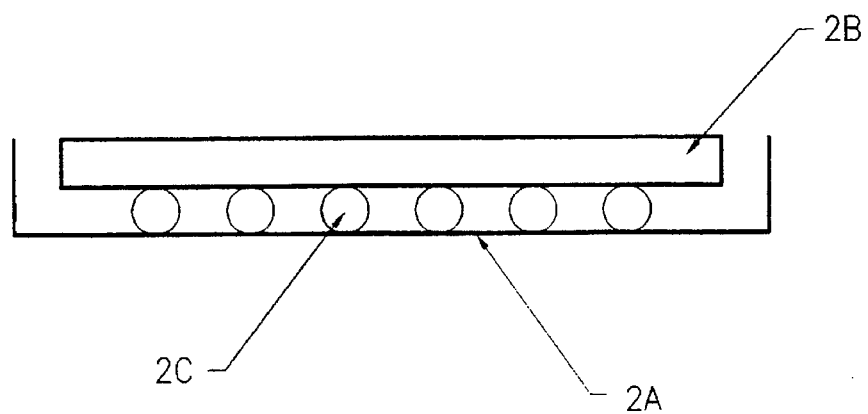

FIG. 2B-2 is the inertial method of determining the unknown mass. The top layer 2B is resting on a layer of ball bearings 2C that is on top of the bottom layer 2A. The layer of ball bearings 2C allows the top layer 2B to insulated from vibrations. In otherwords, the top layer 2B can be vibrated without losing energy to the surrounding area.

Figure 3A:
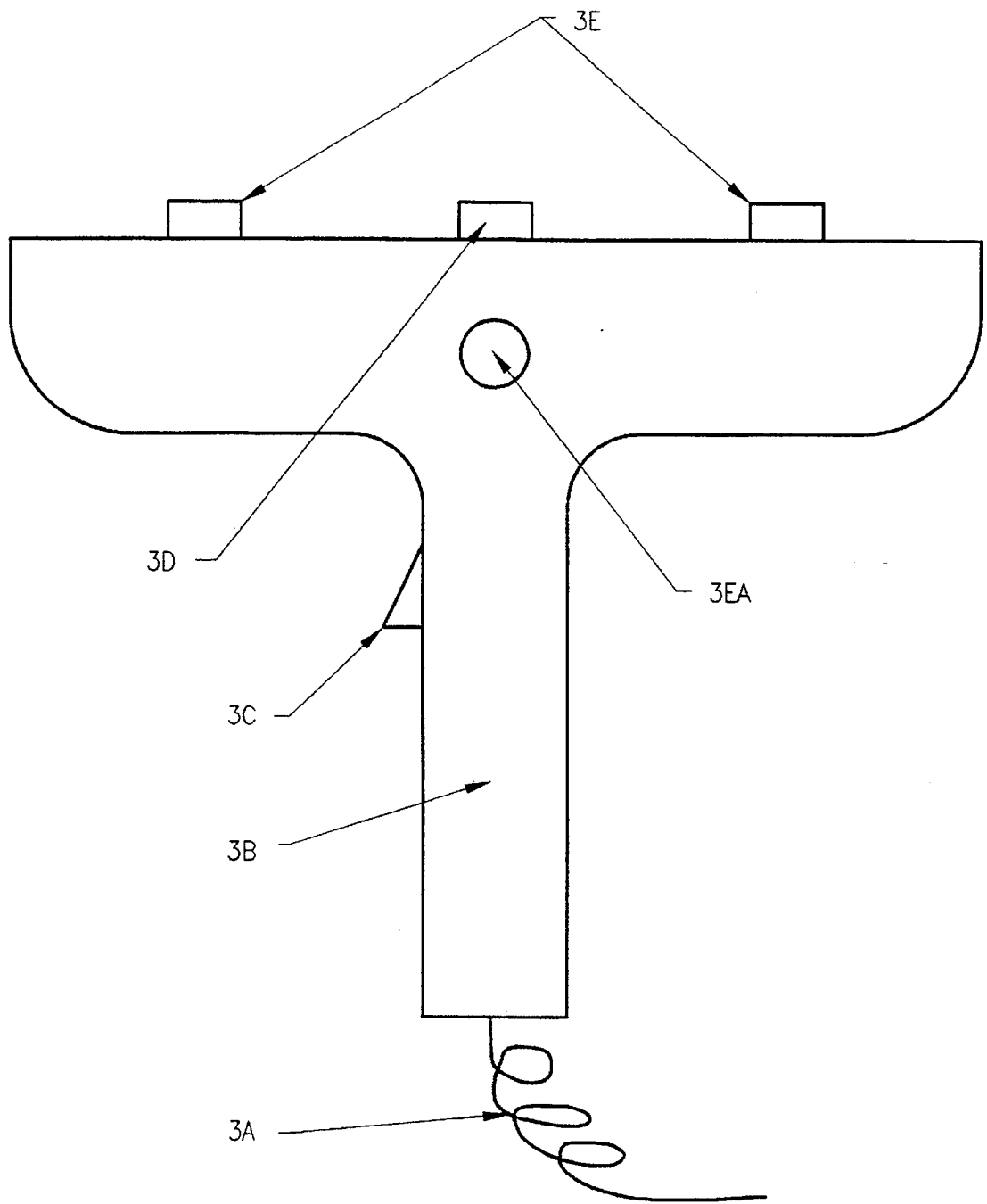
FIG. 3A shows the outside of the device, Wave Reader.

FIG. 3A shows the outside of the wave reader 3. The cord BA supplies electric power to the unit 3 and allows data to communicate to the laptop 1BC. The trigger 3C on the handle 3B can activate the reader 3. The adjustment Knob 3EA turns to move the two receivers 3E in or out equidistant from the transmitter 3D. In this way, the operator can adjust the wave reader 3 so both receivers 3E and transmitter 3D can press against varying widths of base plates 2. This allows the wave energy to be propagated from the transmitter 3D, permeate throughout the base plate 2 and its goods 1AA and reflect back to the receivers 3E. By substracting wave's intensities of the receiver's 3E average from the transmitter 3D, the saturation or absorption energy can be found. The transmitter 3D car, be a mechanical wave that vibrates the base plate 2 and the receivers 3E measures the amplitude of vibrations. Also, the transmitter 3D can be a sound transducer and the receivers 3E can be sound sensors. FIG. 1 shows only one wave reader 3, however several readers 3 might be necessary for different types of goods 1AA. A mechanical wave reader 3 might be used for metal cans or glass bottles. While a sound wave reader 3 might be best for plastic or paper items 1AA, ultrasound reader 3 could be useful in some items as well; however, ultrasound has special problems. Because of the high frequency, the aborption of energy is on the surface (called the skin effect) of the goods 1AA. This means the saturation energy is a measure of surface area and not volume of the item 1AA. The geometry of the goods 1AA could be very important for the computer to calculate the correct number of goods 1AA. Clearly, more extensive data base would be necessary upon initialization.

Figure 3B:
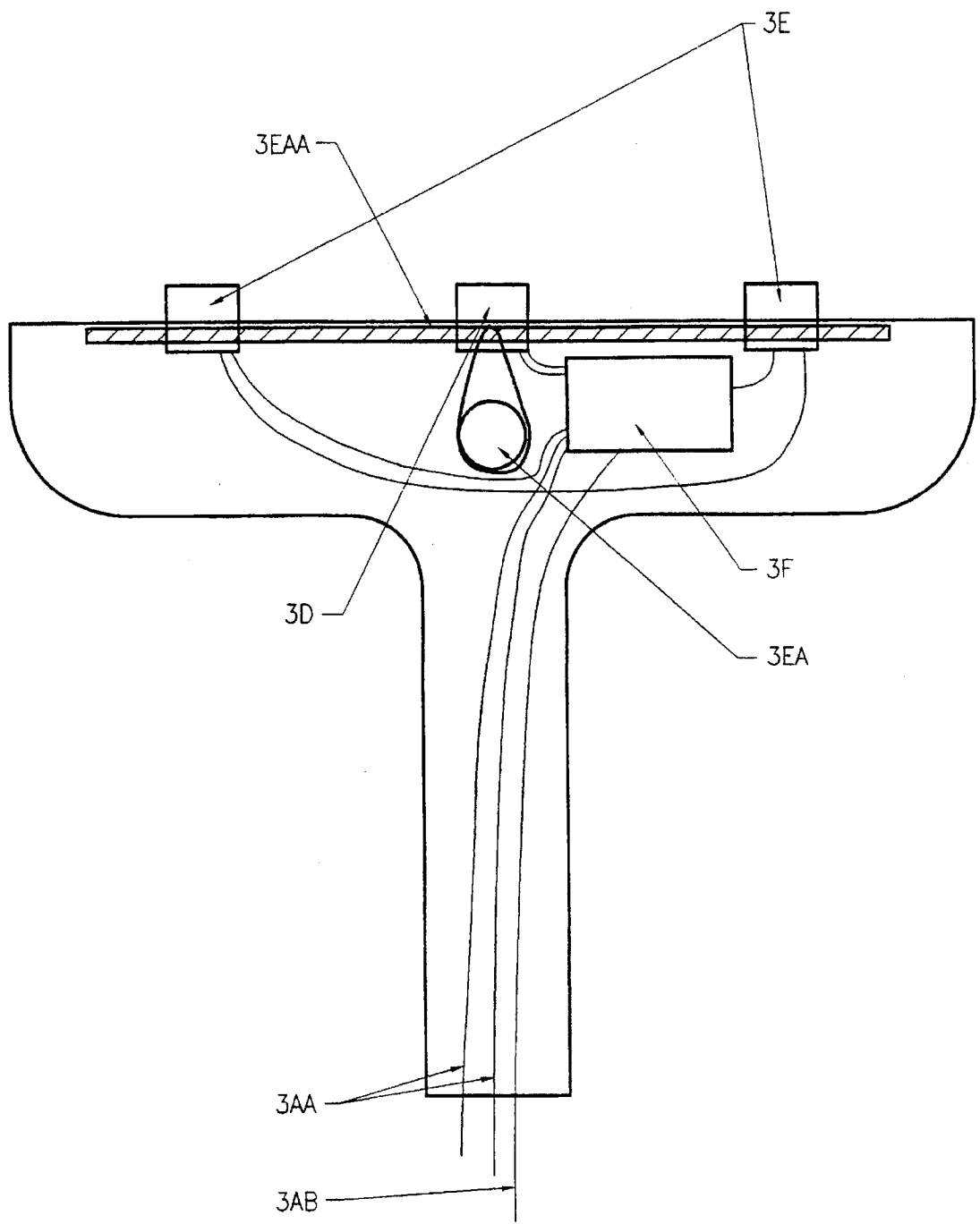
FIG. 3B shows the inside of the Wave Reader.

FIG. 3B shows the inside of a wave reader 3. The cord 3A has two parts, the power wire 3AB and the data wires 3AA.

The adjustment Knob 3EA turns a band 3EAB that is connected to the screw rod 3EAA and turns to move the receivers 3E in an equidistant way from the transmitter 3D. The control circuit 3F activates or deactivates the transmitter 3D and receives data from the receivers 3E while interfacing to the laptop computer 1BC. The control circuit can be based with or without a microprocessor. If the laptop 1BC has specialized software, the control circuit unit 3F can be a simple relay unit; however, a processor would determine when a standing wave exist (see FIG. 4A,4B and 4C) and calculate the saturation energy (see FIG. 5).

Figure 4A:
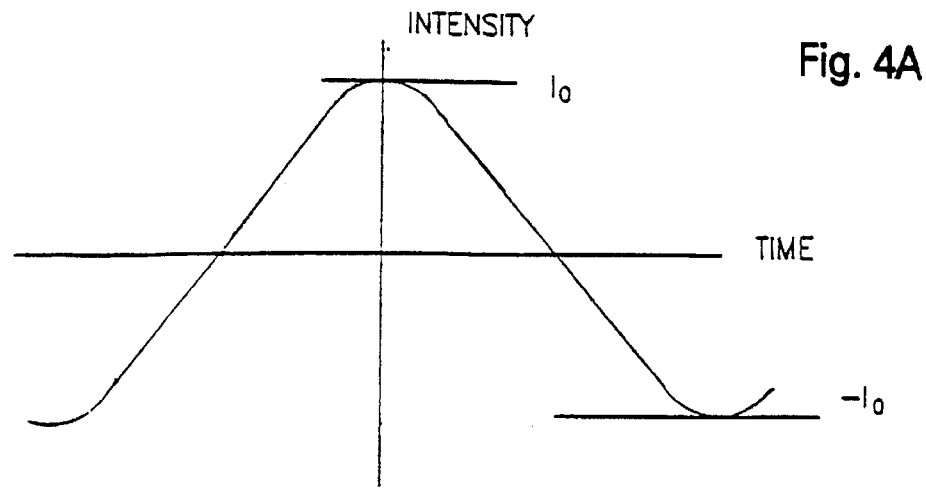
FIG. 4 illustrates the method of Knowing when a standing wave exist in the base plate and its goods.
Figure 4B:
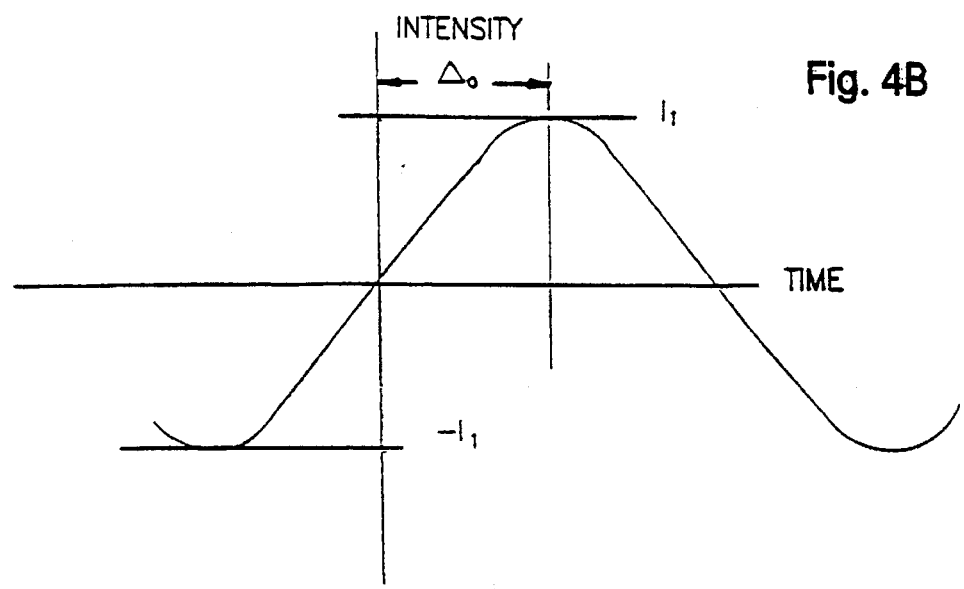
Figure 4C:
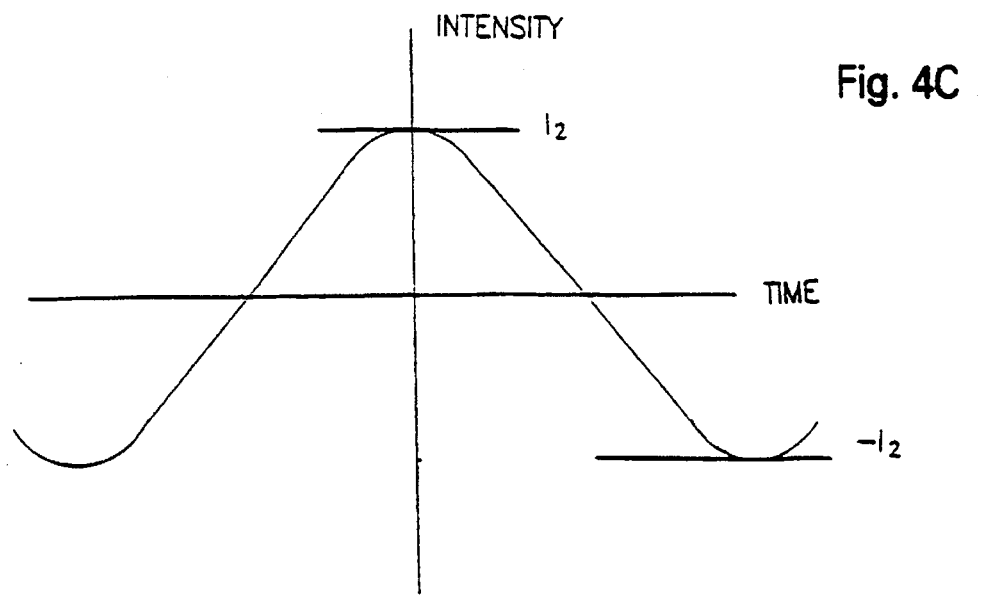

FIGS. 4A,4B & 4C illustrate how a processor (either based in the laptop 1BC or the control circuits 3F) Knows when a standing wave exists in the base plate 2 and its goods 1AA.

FIG. 4A shows the wave graph, intensity vs time, of the outputted transmitter 3D. FIG. 4B & 4C shows the receiver's 3E average of incoming waves (intensity vs time). The average of the two receivers 3E helps eliminate the lack of symmetry in the goods' 1AA distribution. FIG. 4B has a shifted high point in the intensity graph than that of the transmitter's 3D graph (FIG. 4A). This shift is called the phase angle shift (delta symbol). In FIG. 4C, the phase angle is zero with respect to the transmitter's phase angle. When the transmitter 3D is activated, the phase angle will be nonzero (FIG. 4B). When the material becomes saturated, standing wave exist, the phase angle becomes zero again (FIG. 4C). The maximum intensities for all figures are different. The saturation energy is found by subtracting the receiver's 3E average's intensity (I2) from the transmitter's 3D intensity (I0).

Figure 5:
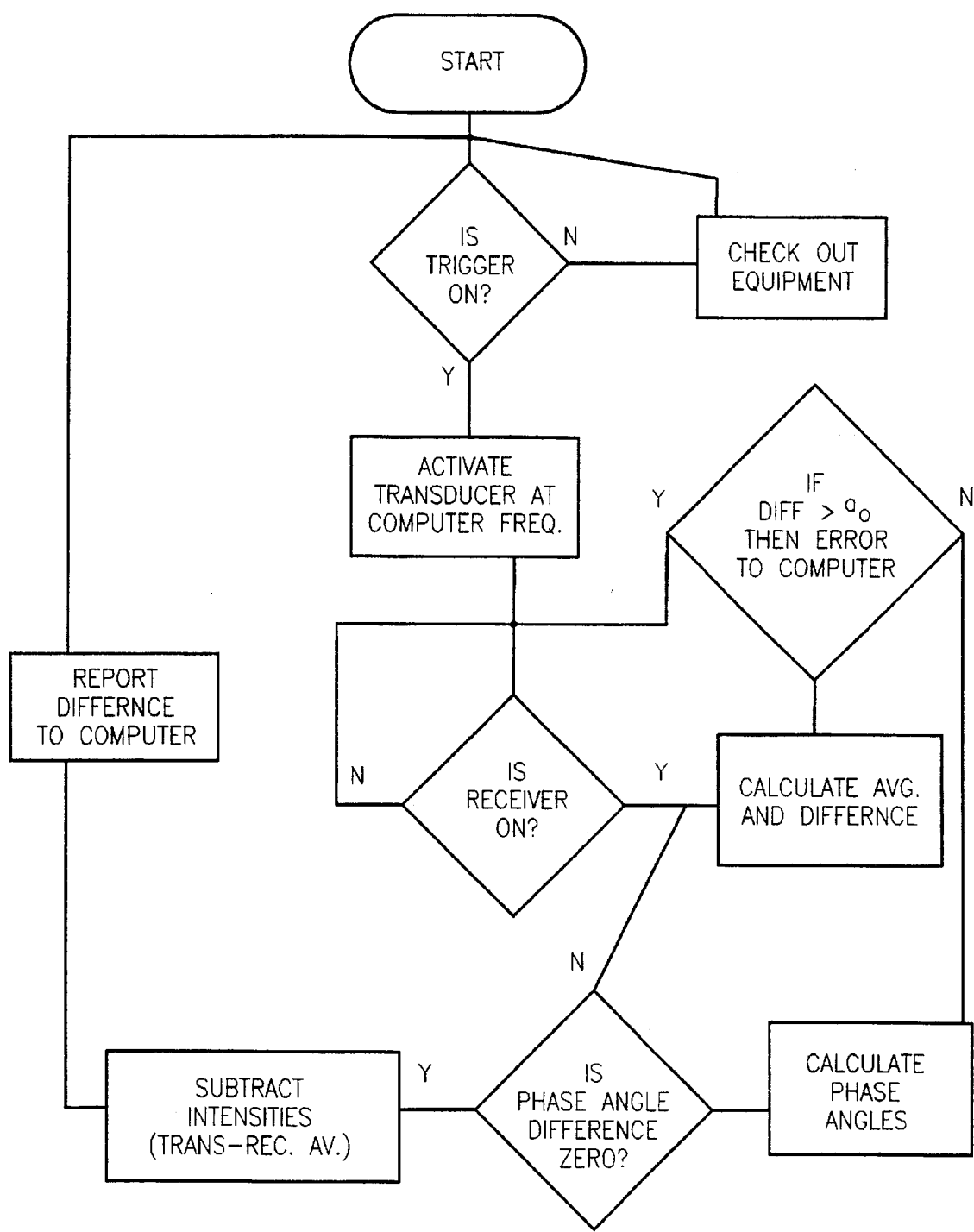
FIG. 5 shows the flow chart for a processor that uses the Wave Reader's internal parts.

FIG. 5 shows the flow chart for a processor. If the trigger is not pressed, the unit runs a diagnostic check on the system. When the trigger is pressed, the wave transmitter is activated at the computer frequency. When the receivers collect data, the processor calculates the average and difference. If the difference exceeds the error bounds, issue and error (adjust recievers) calculate the phase angles. If the phase angle is nonzero, process more receiver data until the phase angle is zero. When the phase angle is zero, subtract the transmitter's intensity from the receiver's average intensity for the saturation energy and report it to the computer. An optimum frequency table should be available to store owners. Experimentally, it should be determined the correct wave reader and its operating frequency for the wave. Questions concerning the type of container (metal with gas, liquid or gas inside, glass with liquid or solid inside, paper cardboard with solid, hard plastic with gas,liquid or solid inside or plastic wrap with solid inside) should be tested for the best results. Another allowance should be made for real absorption energy being not additive but approximately additive. Perhaps there could be a small difference between items stacked on top of each other (series) and items placed flat on the plate (parallel). In otherwords, the geometry (series and parallel) could introduce some small error in the additive law. This could mean more initialization data at the installation and more computer time to calculate the geometry. In this case, a requirement of "straightening up the items" on the base plate may be necessary for small computer error.

Consider an example of sound absorption. Let a sound wave of 10,000 Hz travel thru a water filled pipe of radius $1/100$ meters and 10 ft long. The sound power absorbed is 1.3 times 10 to the minus 12 power watts. A very soft whisper in a room is 10 to the minus 10 watts. Clearly the example is hard to detect. Fortunately, the attenuation coefficient for water is very small namely 0.012 nepers/meter. We can expect much higher coefficients with real material. It is imortant to Know that the absorption coefficient depends solely on temperature and sound frequency. Increasing frequency (in general) means increasing absorption. Therefore materials will need an optimum frequency for detection of the receivers.

Another method of measuring the unknown mass on the base board exists for mechanical waves. That is, changes in the inertial mass due to perturbating the base of the mass. To explain, consider a mass suspended by a spring from a base. By vibrating the base, the mass bobs up & down in response. By measuring the response and Knowing the forcing vibration, the unknown mass can be determined (and therefore the number of unit masses).

Figure 6:
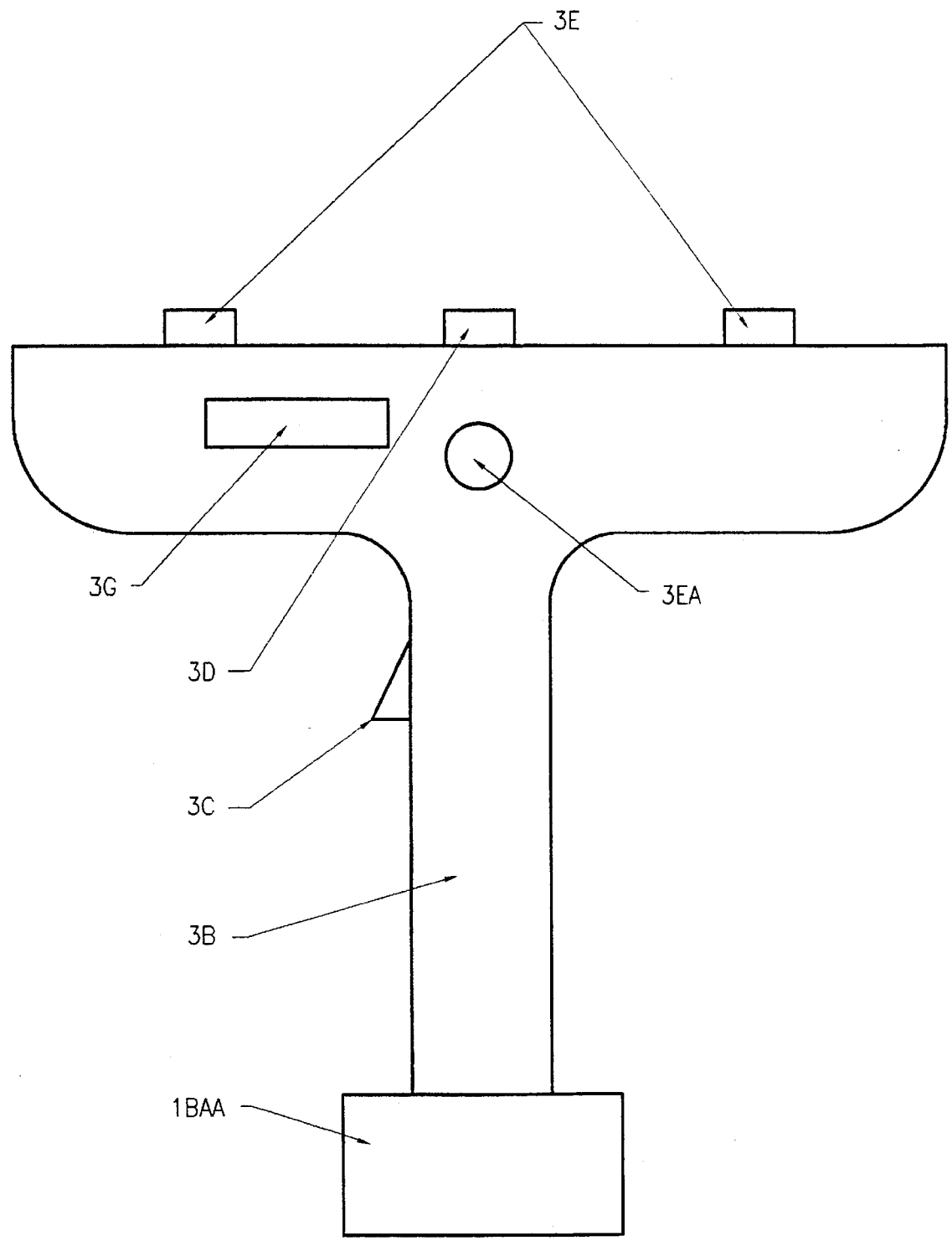
FIG. 6 shows the wave reader in its portable form.

FIG. 6 shows an alternative wave reader 3 that is portable. A battery pack 1BAA provides an energy source. The display 3G (probably LCD) allows the wave intensity to be reported. With this model, an owner can record the absorption energy by direct means and later input the data to their PC computer for analysis.

What is claimed is:

1. A method of determining the physical inventory of a type of store goods, comprising the steps:

providing an insulated base plate having sufficient space thereon for multiple items of said type of goods;

emitting pressure waves into said base plate;

receiving reflected waves from said base plate;

adjusting the emitted pressure waves until a standing wave exists within the base plate;

determining the difference in intensity between said emitted waves and said reflected waves; and calculating the number of said items on said base plate on the basis of said difference.

2. The method of claim 1, wherein said measuring step is performed with a pressure transducer, further comprising the step of controlling data into and out of said pressure transducer with a microprocessor.

3. The method of claim 2, wherein said measuring step is performed with a battery pondered pressure transducer having a battery powered display.

4. A system for determining the physical inventory of a type of store goods, comprising:

an insulated base plate having sufficient space thereon for multiple items of said type of goods;

means for emitting pressure waves into said base plate;

means for receiving reflected waves from said base plate;

means for adjusting the emitted pressure waves until a standing wave exists within the base plate;

means for determining the difference in intensity between said emitted waves and said reflected waves; and means for calculating the number of said items on said base plate on the basis of said difference.

5. The system of claim 4, further comprising microprocessor means for controlling data into and out of said measuring means.

6. The system of claim 5, wherein said measuring means includes a battery pack and battery powered display.

* * * * *